United States Patent [19]

Bartholdsten et al.

[11] 4,409,169

[45] Oct. 11, 1983

[54] METHOD FOR MANUFACTURING DISK-SHAPED INFORMATION CARRIERS

[75] Inventors: Dieter Bartholdsten, Hanover; Hermann Koop, Ronnenberg; Erhard Schrode, Lehrte; Adelbert Zielasek, Burgwedel, all of Fed. Rep. of Germany

[73] Assignee: Polygram GmbH, Hamburg, Fed. Rep. of Germany

[21] Appl. No.: 285,618

[22] Filed: Jul. 21, 1981

[30] Foreign Application Priority Data

Jul. 30, 1980 [DE] Fed. Rep. of Germany ....... 3028947

[51] Int. Cl.³ .............................................. B29D 17/00
[52] U.S. Cl. ................................ 264/107; 264/328.7; 425/810
[58] Field of Search ................ 425/810; 264/107, 106, 264/328.7

[56] References Cited

U.S. PATENT DOCUMENTS

| | | | |
|---|---|---|---|
| 3,039,139 | 6/1962 | Nishioka et al. ................... | 425/385 |
| 3,196,485 | 7/1965 | Bottenfeld ...................... | 425/810 X |
| 3,941,547 | 3/1976 | Hunyar ........................... | 425/810 X |
| 4,251,479 | 2/1981 | Pecht ............................. | 425/810 X |
| 4,302,411 | 11/1981 | Nakagawa ...................... | 425/810 X |

FOREIGN PATENT DOCUMENTS 43-12021  5/1968  Japan ................................. 425/810

*Primary Examiner*—Thomas P. Pavelko
*Attorney, Agent, or Firm*—Hill, Van Santen, Steadman & Simpson

[57] ABSTRACT

A method for manufacturing high information density storage disks, suitable for optical reading, out of transparent synthetics having a high glass temperature and high dimensional stability. The present injection molding method avoids potential double diffraction disruptive effects created by frictional or shearing forces. The synthetic material which is to be pressed is injected into one of the mold halves at a temperature that significantly exceeds the pressing temperature of the compression form and is injected so as to form a lump of the material. The pressing step wherein the compression form is closed down to a squeezing gap width is initiated prior to the termination of the injection operation. Likewise the cooling operation is initiated prior to the termination of the pressing step and both the cooling and pressing operations chronologically proceed at approximately an exponential rate.

12 Claims, 9 Drawing Figures

METHOD FOR MANUFACTURING DISK-SHAPED INFORMATION CARRIERS

BACKGROUND OF THE INVENTION

1. Field of the Invention

The present invention relates to a method for manufacturing disk-shaped information carriers which can be optically read out, and more particularly to such carriers, manufactured of transparent synthetics, (for example polyvinyl chloride (PVC), polymethyl methacrylate (PMMA), polycarbonate (PC), polysulfone (PS), etc.), that have a high storage density. The method utilizes a molding press equipped with at least one pressing matrix, and two molding halves movable with respect to one another during the molding cycle and also able to be heated and cooled. In addition, the molding halves are provided with a squeezing gap in order to limit the hollow space of the mold.

2. Description of the Prior Art

Molding methods for the manufacture of synthetic, disk-shaped information carriers are known, U.S. Pat. No. 3,039,139 can be seen in this regard. The development of information carriers having a very high storage density which can optically be read out have become known for video recordings and, more recently, for digital audio recordings as well. These information carriers place high demands on manufacturing methods using a pressing with respect to planarity and optical properties of the finished memory disks.

As has been shown, thermoplastic materials with a sufficiently low glazing or glass temperature can be employed for pressing such information carriers. However, given disks made out of the PVC/PVA copolymer which is usually employed, the dimensional stability is no longer guaranteed at higher temperatures. Disks of PMMA, which is only slightly more thermally stable, also have problems because of the excess moisture sensitivity of the material. Under certain conditions, this sensitivity of the material requires a sandwich construction of the video LP disk which consists of two disks bonded to one another at the information side. This construction is particularly cost-disadvantageous for the shorter informational programs which are to be accommodated on one disk side. In order to insure their planarity, both types of disks—even after storage, require more involved packaging than is standard in the recording field.

In processing thermoplastic materials having a high glass (or glazing) temperature, an improved dimensional stability can be achieved, avoiding the necessity for a sandwich structure and its required special packaging measures. However, with this material different difficulties arise in the manufacture of such disks with respect to unevenness, particularly with respect to optical double diffraction effects. In the optical read-out of the information impressed in the form of pits into a disk surface, such double diffraction effects result in an undesired modulation of the light source (normally a laser). This modulation disrupts the fault-free reproduction of the stored information.

SUMMARY OF THE INVENTION

The present invention has an underlying objective to improve the known molding or pressing method which has been above-described to permit the use of dimensionally stable thermoplastics for the production of high information density storage disks suitable for optical reading. In addition to the planarity requirement, the thermoplastic disks must also be free of disruptive double diffraction effects.

The resolution of this objective is inventively achieved in the following manner: the synthetic which is to be molded into the storage disks is sprayed or injected into a compression mold, which has been opened to form a gap, through an opening in the center of one of the mold halves. The synthetic is injected at a temperature which significantly exceeds the pressing temperature of the compression mold so as to form a lump of material. Additionally, according to the present invention, the pressing of the lump of material is started before the conclusion of the material injection operation by a closing of the compression mold, leaving a sqeezing gap having a dimensional magnitude on the order of a number of tenths of the thickness of the finished storage disk. The cooling operation is inventively started prior to the termination of the pressing operation, the sequential order of the pressing and cooling operations preceding in a chronological sequence which approaches or approximates an exponential function.

While the present invention should in no way be viewed as limited by the following explanation, it is believed that the previously referred to unevenness and double diffraction effects result from the influence of frictional or shearing forces on the molecular structure as the material flows during the pressing operation. By means of the special features according to the present invention, a continuous, low-friction material flow of the synthetic to be pressed is assured, and thus the required quality having a double diffraction which is lower than 15 nm/mm is achieved. By means of the chronological sequence described, the gradient of shearing strain, which increases with an increasing flow path during the pressing of the lump of material after its injection, is significantly reduced.

In order to achieve a material transport path which is as short as possible, the injection unit which plasticizes the material to be pressed and injects it into the compression form or mold may be conveniently integrated into the injection molding device. Due to the short material transport path, the thermal losses of the molding material which is to be injected into the mold during the pressing cycle are kept sufficiently small. This is particularly important in view of the formation of a small temperature gradient across the cross-sectional area of the injected lump of material.

Undesirable frictional or shearing forces can also be advantageously further reduced by metering an excess amount, (on an order of magnitude of 5–8%), of material to be injected into the compression mold. By so doing, the flow phenomena which generate the shearing strain are attenuated during the pressing operation.

Since profile skips or skip-like depressions, which are also standard in the central area of records, are the cause of undesired frictional or shearing forces, it is advantageous to design the hollow space of the mold, which is limited by the annular ridges, so as to be free of profile skips. Orientation of the molecular structure caused by the shearing strain leads to polarization effects and thus to double diffraction in the areas adjacent to the profile skips.

Similarly, the change of profile also generally required at the outer edge for pressure build-up in the mold, in order to avoid condensation effects (bubble formation), causes strain conditions leading to double diffraction effects. The present invention makes allowances for this problem by increasing the diameter of the hollow space of the mold by several percent, for example 5%, in comparison to the rated disk diameter of the storage disk to be pressed. Thereby, the plate is pressed approximately 5% greater in area and the disrupted edge area is then cut off. To keep the size of edge area which is cut off as small as possible, the width of the squeezing or outer edge is set to approximately 50% of the disk thickness instead of the standard 10-20% by means of pressure rings. With this embodiment, despite the 50% mold openings, the pressure in the form is retained after the pressing in order to avoid the previously described condensation effects, and the cooling, according to the present invention, is started earlier than under other methods.

To prevent subsequent shearing strains from having an influence on the material during the processing of the disk edge after removal from the mold, it is desirable to reduce the diameter of the storage disk to the rated diameter by means of a cutting device which largely avoids shearing forces, for example a laser cutting device. The consequence of having shearing strains is to induce double diffraction effects.

Various other objects, advantages, and features of the present invention will become readily apparent from the ensuing detailed description and the novel features will be particularly pointed out in the appended claims.

DESCRIPTION OF THE PREFERRED EMBODIMENTS

Figure 1:
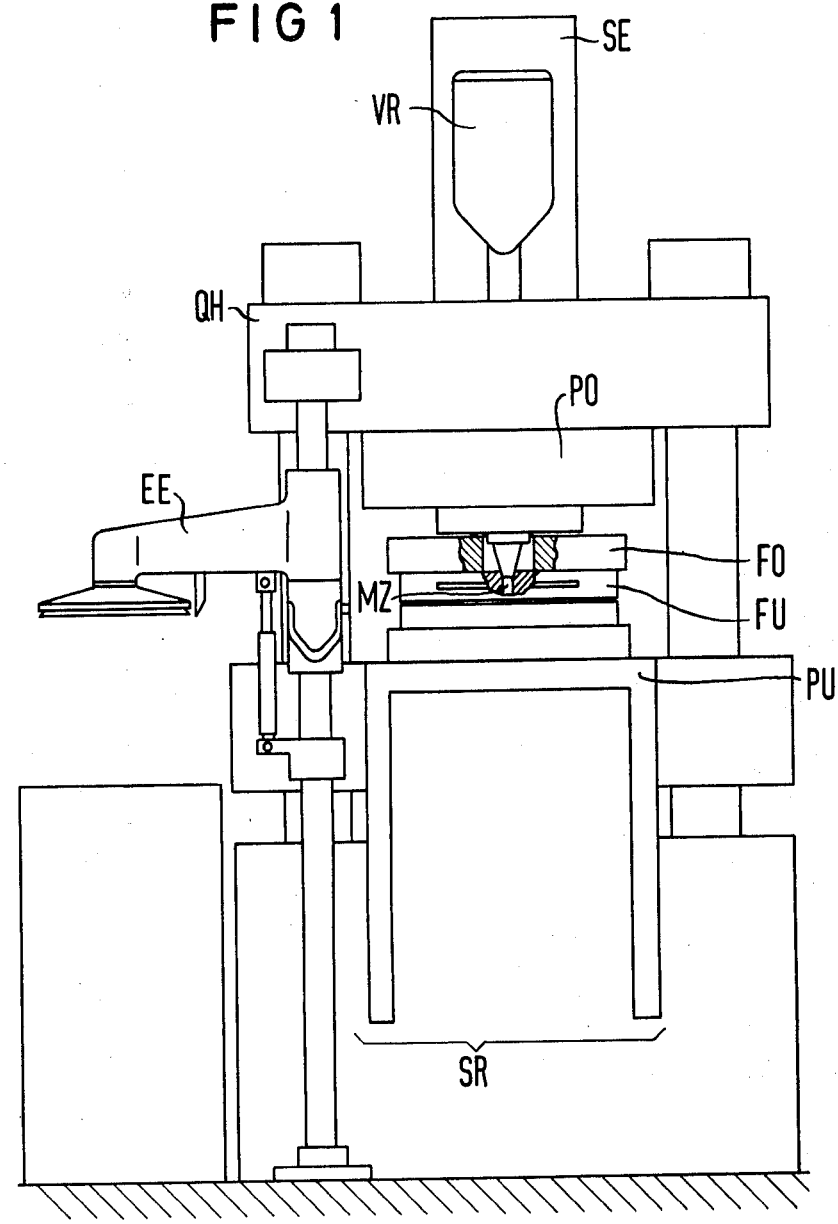
FIG. 1 is a schematic illustration of an injection molding device making use of the inventive method.

The injection molding device illustrated in FIG. 1 exhibits a support SR with a stationary cross head QH to which an upper part PO of the press together with an upper part FO of the mold are secured. A lower part PU of the press together with a lower part FU of the mold are likewise secured to the support SR and are designed so as to be movable against the upper part PO of the press together with the upper part FO of the mold. An injection unit SE with a reservoir VR for the synthetic is secured directly to the stationary cross head OH and is thus integrated into the injection molding device. After being brought to the necessary working temperature, the material to be pressed is injected by the injection unit SE through the material feed MZ in the center of the upper part FO of the mold and from there into the hollow space of the mold. Further, the injection molding device exhibits an unmolding unit EE which, at the end of a pressing cycle, smooths the unmolded storage disks or, when required, reduces them to their rated diameter and transfers them to storage.

Figure 2:
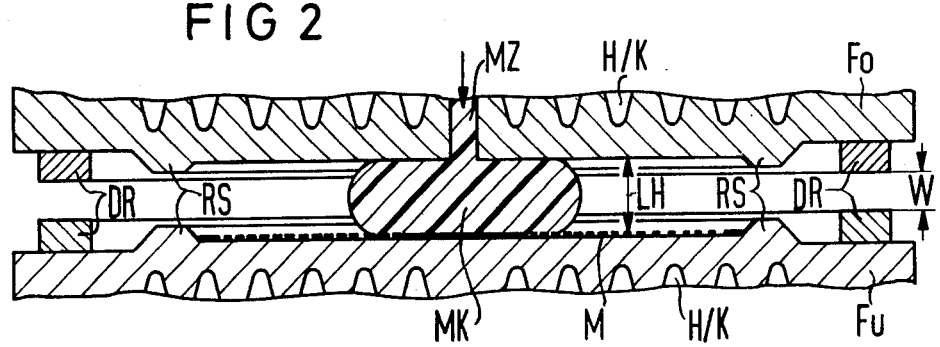
FIG. 2 is a side sectional view of an opened compression form at the beginning of a pressing cycle in an injection molding device as shown in FIG. 1.

At the beginning of a pressing cycle, the upper part FO of the mold and the lower part FU of the mold, as shown in FIG. 2, are pulled apart from one another by a gap having width W. The material to be pressed is now injected by the injection unit through the material feed MZ with a temperature which is significantly higher than the heated temperature of the compression form in order to form a lump of material MK in the hollow space of the mold now increased to the clear height LH. The heating of the compression form occurs by means of the heating/cooling channels H/K indicated in the section illustration. As FIG. 2 and FIGS. 3 and 4 further show, the hollow space of the mold is limited by means of annular ridges RS which form a squeezing gap having width QB in the closed compression form shown in FIG. 3. Further, the upper part of the mold FO and the lower part of the mold FU respectively exhibit a pressure ring DR at their outer edge on those sides which respectively lie opposite one another. The pressure rings DR determine the spacing between the upper part FO and the lower part FU of the mold in the closed state of the compression form according to FIG. 3. The matrix M carrying the information is secured to the lower part FU of the mold.

Figure 3:
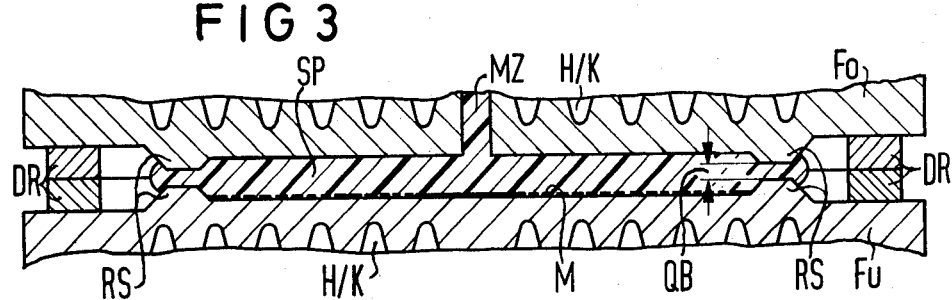
FIG. 3 is a side sectional view similar to FIG. 2 showing the compression form in its closed state.
Figure 4:
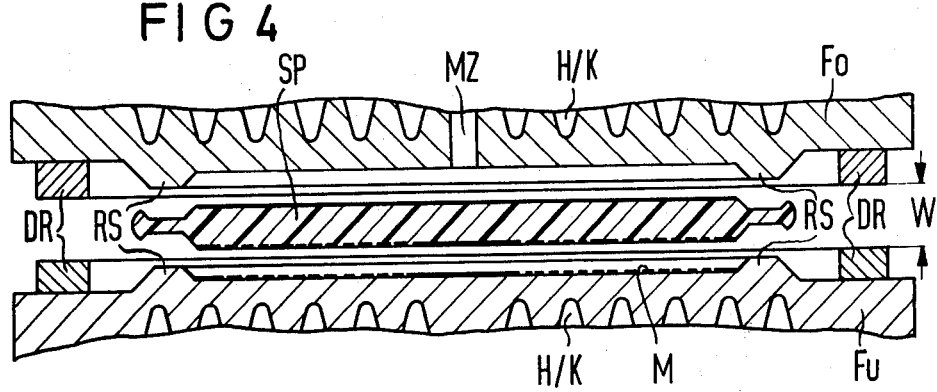
FIG. 4 is a side sectional view similar to FIGS. 2 and 3 showing the compression form in its open state at the end of a pressing cycle.

As FIG. 3 shows, the squeezing gap width QB has a value which amounts to approximately 50% of the thickness of the storage disk SP to be pressed. The squeezing gap is required so that, during the pressing and during the cooling, subsequently thereto, a sufficient pressure is maintained within the pressed material in order to suppress disruptive condensation effects (bubble formation) in the inside of the material. Said squeezing gap—which lies in the magnitude of 1 through 2/10 of the disk thickness in standard disk presses, and is essentially set as a function of the flow resistance and the pressing pressure, is inventively defined by means of pressure rings DR which are set to a higher value in order to achieve an attenuation of the critical edge area as well as a reduction of refluxes into interior disk areas, thus keeping the double diffraction effects arising as a consequence of this as small as possible. In order to nonetheless guarantee the pressure buildup in the material during the pressing phase and the subsequent cooling phase, which pressure is required in order to suppress condensation effects otherwise caused by said enlargement of the squeezing gap width, it must be seen to, as will be explained below, that the flow resistance, which is now too low, is compensated for by increasing the mass viscosity at the proper time, particularly in the area of the squeezing gap.

Before the pressed disk is unmolded, the compression form must be cooled by means of switching from heating to cooling. Subsequently, the compression form is opened and the storage disk SP is unmolded. It is to be understood that the lower part FU of the mold can be removed from the upper part FO of the mold beyond the gap width W for the purpose of unmolding.

Figure 5:
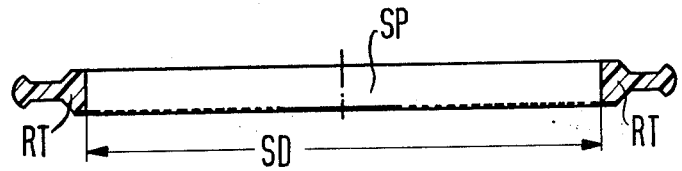
FIG. 5 is a side sectional view showing an unmolded storage disk produced in the course of a pressing cycle.

As has previously been explained, the hollow space of the mold of the compression form having height LH is increased by approximately 5% with respect to the rated diameter SD in order to shift the undesired double diffraction effects in the edge area toward the outside, and out of the information area by so doing. The reduction of the pressed storage disk SP to the rated diameter by cutting off the edge part RT (FIG. 5) is expediently undertaken with a cutting device, for example with a laser cutting device, which largely avoids shearing forces so that the structure of the disk not be subsequently changed at the edge by means of shearing forces, with undesired polarization phenomena being produced in the edge area as a result of the entropy elasticity.

Figure 6:
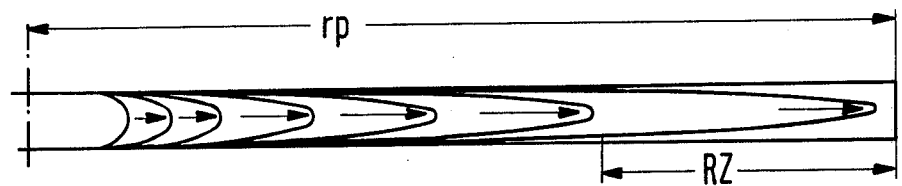
FIG. 6 is a schematic diagram illustrating the gradient of the yield stress without compensation utilizing a closing of the form and its cooling according to an exponential function.

FIG. 6 shows the flow rate profile generally existing over the cross-section of the storage disk for different disk radii rp. The flow rate gradient generating the shearing strain, as can be seen from the diagram, increases more and more towards the edge. By means of controlling the closing speed according to an exponential function, this increase may be compensated for to a very high degree.

Figure 7:
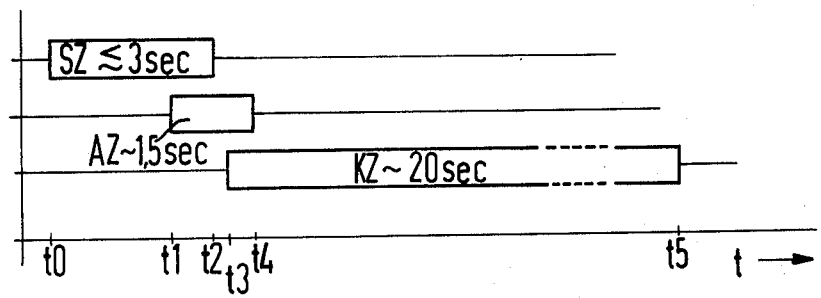
FIG. 7 is a time diagram illustrating the pressing cycle in greater detail.

As pertinent investigations have shown, in the manufacture of such storage disks consisting of predried PC granulate according to the present invention, favorable properties with respect to the planarity of the pressed disks and sufficiently small double diffraction effects are produced when the injection pressing cycle sequences in the manner illustrated in the diagram of FIG. 7. In the following example, which is not to be viewed as limiting applicants invention in any way, the PC granulate heated to 300° C. is injected into the compression form which has been preheated to approximately 220° C. from point in time t0 to point in time t2. The injection occurs within approximately ≦3 seconds, into the compression form opened up to the gap width W (injection time identified as SZ). The clear height (LH) of the hollow space of the mold of the opened compression form FO/FU preferably has four times the value of the thickness of the storage disk SP to be pressed. The pressing time Az, which already begins at point in time t1, approximately 25% before the termination of the injection operation, lasts approximately 1.5 seconds up to point in time t4. By so doing, thermal losses are kept as small as possible. Due to the thermal inertia, the cooling time KZ has already begun at point in time t3 in which the pressing operation is only ⅔ terminated. It is approximately 20 seconds up to point in time t5. As has already been pointed out, the inception of the cooling at a point in time which the pressing operation is only ⅔ terminated has has its foundation in the fact that the flow resistance which is too low due to the enlargement of the squeezing gap, is to be compensated for by means of an increase of the mass viscosity at the proper time, at least in the area of the squeezing gap.

Figure 8:
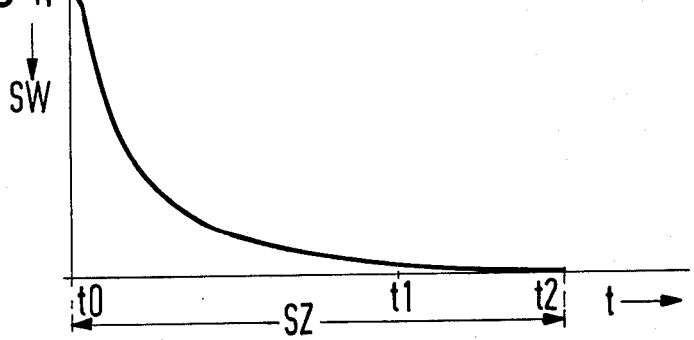
FIG. 8 is a graph illustrating the closing path of the compression form over time.

The time diagram of the closing path SW illustrated in FIG. 8, beginning from the gap width W of the opened compression form, follows an exponential function in a first approximation over the pressing time AZ. In other words, the closing speed is rather great at first and then becomes slower and slower. By so matching the closing speed to the rate at which the material cools during the pressing, the shearing strains and frictional or shearing forces are kept small.

Figure 9:
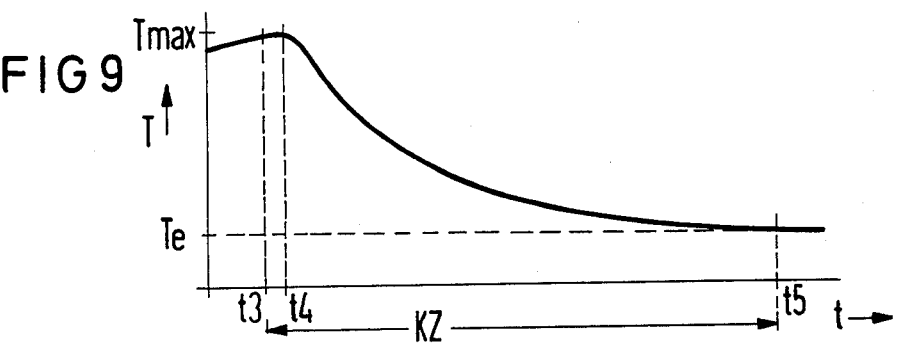
FIG. 9 is a graph illustrating the temperature curve of the compression form over time during the cooling phase.

The time diagram of FIG. 9 shows the decrease of the temperature T during the cooling time KZ. As FIG. 9 shows, the cooling phase already beings before the mold temperature has reached the maximum value Tmax. Then the unmolding temperature Te proceeds downwardly according to an exponential decrease. It becomes clear from this that the molding temperature quickly decreases immediately subsequent to the pressing time.

While we have disclosed an exemplary structure and method to illustrate the principles of the invention, it should be understood that we wish to embody within the scope of the patent warranted hereon, all such modifications as reasonably and properly come within the scope of our contribution to the art.

We claim as our invention:

1. In a method for manufacturing disk-shaped information carriers with a high storage density which can be optically read out, of the type manufactured out of transparent synthetics employing a molding press equipped with at least one pressing matrix, the press havng a compression form comprised of separable mold halves which can be moved towards one another and both of which have means for heating and cooling during the pressing cycle, wherein the improvement comprises: said mold halves each being provided with an annular ridge, the ridges lying opposite one another so as to form a squeezing gap when the mold is closed and serving as an outer boundary for the hollow space of the mold at which material can flow through the gap;
   preheating the transparent synthetic material to a temperature significantly greater than the initial pressing temperature of the compression form;
   injecting an excess of the preheated material than is required for the finished product into the compression form via a central aperture in one of the mold halves so as to form a lump of material;
   pressing the lump of material by closing the compression form to obtain a squeezing gap width with a magnitude equal to several tenths of the thickness of the finished storage disk, said squeezing gap maintaining a pressure in the pressed material while permitting excess material to squeeze therethrough, said pressing step being initiated prior to the termination of the injecting step;
   cooling the compression form, said cooling step being initiated prior to the termination of the pressing step; and
   the pressing and cooling steps chronologically proceeding in an internal sequence which approximates an exponential function so that along with the use of the squeezing gap condensation bubbles and double diffraction effects due to frictional and shearing forces are substantially avoided.

2. In a method for manufacturing disk-shaped information carriers as described in claim 1, wherein an injection unit which plasticizes the synthetic material and injects it into the compression form is integrated into the molding press in order to obtain a material transport path which is as short as possible.

3. In a method for manufacturing disk-shaped information carriers as described in claim 1, wherein the hollow space of the mold, which is bounded by the annular ridges, is free of profile skips.

4. In a method for manufacturing disk-shaped information carriers as described in claim 1, wherein the amount of material injected into the compression form has a mass which is 5–8% in excess of the amount of the finished storage disk.

5. In a method for manufacturing disk-shaped information carriers as described in claim 1, wherein the diameter of the hollow space of the mold is larger than a rated diameter for the finished storage disk.

6. In a method for manufacturing disk-shaped information carriers as described in claim 5, wherein the hollow space of the mold is 5% larger than the rated diameter for the finished disk.

7. In a method for manufacturing disk-shaped information carriers as described in claim 1 and further comprising:
- unmolding the cooled material which has been molded into a storage disk;
- reducing the diameter of the unmolded storage disk utilizing a cutting means which largely avoids shearing forces to obtain a storage disk with the rated diameter.

8. In a method for manufacturing disk-shaped information carriers as described in claim 7 wherein a laser cutting device is provided as the cutting means.

9. In a method for manufacturing disk-shaped information carriers as described in claim 1, wherein the initiation and rate of cooling of the compression form are selected in such a manner that the mass viscosity of the synthetic material is increased sufficiently to compensate for the decreased flow resistance in the area of the squeezing gap and thus allow for the proper buildup of pressure in the synthetic material.

10. In a method for manufacturing disk-shaped information carriers as described in claim 1 wherein the clear height of the opened compression form has a magnitude equivalent to a multiple of the thickness of the finished storage disk.

11. In a method for manufacturing disk-shaped information carriers as described in claim 1 wherein predried polycarbonate granulate, utilized as the synthetic material, is preheated to 300° C. and injected into the compression form which has been heated to approximately 220° C.

12. In a method for manufacturing disk-shaped information carriers as described in claim 11 wherein the injection step occurs over a time period of between 0.8 seconds and 3 seconds, the pressing step occurs over a time period of approximately 2 seconds, the cooling step occurs over a time period of about 25 seconds, the closing pressure of the mold is $\leq 1.2$ MN, the pressing step is initiated between 20–40% prior to the termination of the injection step, and the cooling step begins 20–40% prior to the termination of the pressing step.

* * * * *